2,958,693

C-SUBSTITUTED PIPERAZINE DERIVATIVES AND METHOD

Arthur P. Phillips, Tuckahoe, N.Y., assignor to Burroughs Wellcome & Co. (U.S.A.) Inc., Tuckahoe, N.Y., a corporation of New York No Drawing. Filed Oct. 28, 1958, Ser. No. 769,987

Claims priority, application Great Britain Oct. 31, 1957

7 Claims. (Cl. 260—268)

The present invention relates to certain C-substituted piperazines and the manufacture thereof. In recent years many valuable drugs containing piperazine systems have been developed. (See for example Baltzly et al. Patents 2,436,685; 2,630,435; 2,742,472; 2,748,126; 2,767,186; Harfenist application 453,970 and others.) Piperazine itself and a number of simple C-alkyl piperazines are commercially available but these are not readily employed in chemical synthesis except through attachment on the nitrogen atoms. The compounds of the present invention contain carbon-attached side chains easily capable of further reaction and conversion into valuable pharmaceutical products.

The method of the present invention is the reaction of an ethylene diamine which may have an alkyl substitution on either or both nitrogen atoms or on the carbon atoms with unsaturated diesters and ketoesters having an ethylenic bond conjugated between the carbonyl radicals:

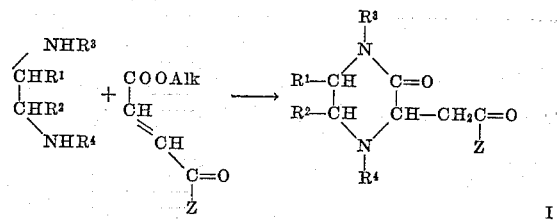

I wherein Alk is an alkyl group (such as methyl or ethyl), $R^1$, $R^2$, $R^3$, $R^4$ are alkyl or aralkyl groups or hydrogen and Z is selected from the class consisting of alkyl, aryl and alkoxy radicals. Thus, if Z is methyl, the reagent is an ester of acetyl acrylic acid, if a phenyl group of benzoyl acrylic acid and if alkoxy of maleic or fumaric acid. Since alcohol is split off during the reaction (as an alcohol) its identity is of minor importance for the reaction.

The reaction probably proceeds through a Michael addition of one nitrogen to the conjugated ethylenic bond giving II which then cyclizes.

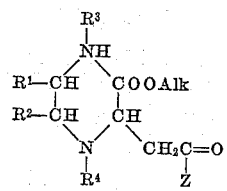

When $R^3$ and $R^4$ are hydrogen, the reaction proceeds rapidly and in good yield, generally affording a crystalline product. In such cases the reactants can advantageously be dissolved in ether or a similar solvent and the product is obtained immediately in a usable form.

When $R^3$ and $R^4$ are alkyl or aralkyl groups the reaction is appreciably slower and requires heat to be finished in a convenient time, however, the yields are still very satisfactory (70% or better). The temperature used is conveniently in the range 100–200° and the course of the reaction can be followed by collecting the alcohol that is distilled off and measuring its quantity. Those products tend to be oils and are purified by vacuum distillation.

When $R^3$ and $R^4$ are different, isomeric products may be formed though one will usually preponderate. It is believed that when one of these is hydrogen and the other alkyl or benzyl, the hydrogen will function as $R^4$, but the generality of this is not yet established.

The useful employment of the compounds of this invention will be easily perceived by a skilled chemist.

Thus on alkylation of compound I only one nitrogen will react giving a mono N-alkyl piperazine (isomeric with that to be expected from employment of $$RNHCH_2CH_2NH_2$$

in the original reaction). Reduction (as with $LiAlH_4$) of the compounds of type I affords C-substituted piperazines III having an alcoholic hydroxyl ($R^5$=H, alkyl or aryl, according to the nature of Z). Esters of type III with benzoyl, mandelic, atropic, diphenylacetic and benzilic acids or the like readily prepared by known methods have local anaesthetic and spasmolytic properties.

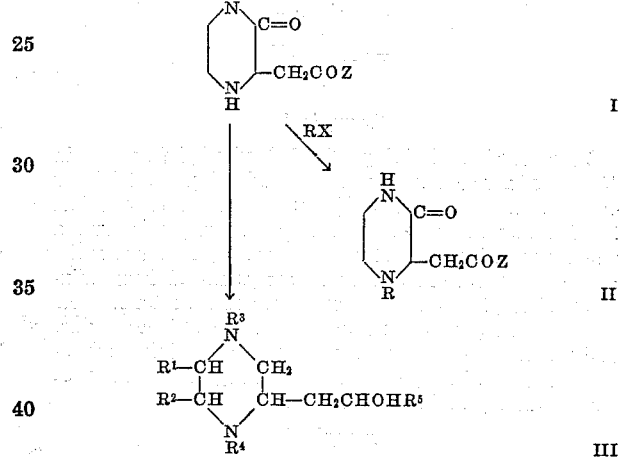

Compounds of type III when R=alkyl or aryl can be re-oxidized with chromic acid to give compounds of type IV which can react with a Grignard reagent (such as phenylmagnesium bromide) or a lithium alkyl (such as 2-pyridyl-lithium) to give tertiary alcohols V (where $R^6$ is phenyl, pyridyl or the like) which have spasmolytic and anti-histaminic properties.

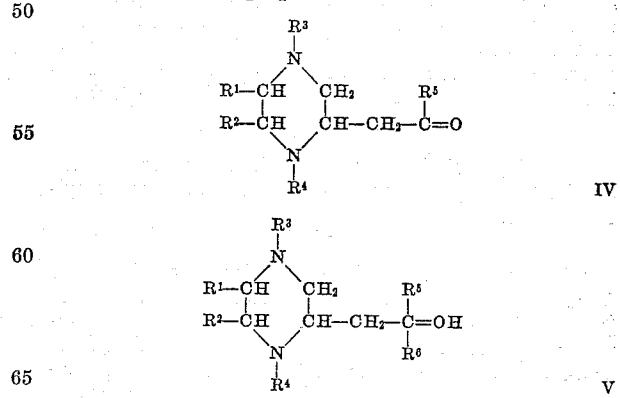

Further reactions of type I may result in additional cyclizations. For example compound VI, when reacted with potassium cyanate presumably forms first the urea VII which reacts further giving the fused pyrimidopyrazine VIII. A similar reaction takes place when VI (as the free base) is reacted with S-methyl iso-thiouronium salts, giving an intermediate guanidine, and dihydroxy-aminopyrimidopyrazine.

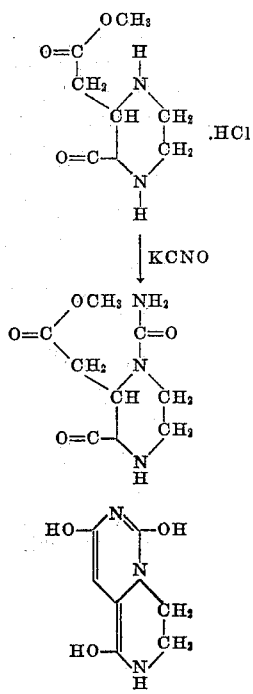

Example I

To a solution of 17.2 g. (0.1 M) of ethyl fumarate in 100 cc. of anhydrous ether was added 6.6 g. (0.11 M) of ethylenediamine (98-100%) and the mixture was left for 2 hours at room-temperature. During this time a white crystalline product was formed. After 2 hours the product was collected and was recrystallized from mixtures of ethylacetate and hexane or from acetone. The yield was 11 g. (60%); M.P. 109-110° C. The product had the composition of 2-carbethoxy-methylpiperazin-3-one. It formed a hydrochloride melting at 180-181° C. which was crystallized from ethanol.

Example II

Under similar conditions ethyl maleate reacted with ethylenediamine to give the identical product, M.P. 109-110° C. crystals from acetone or from ethanol.

Example III

Addition of 7 g. of ethylenediamine to a solution of 14.5 g. (0.1 M) of methyl maleate in 100 cc. of ether gave, after 2-3 hours at room-temperature, 14 g. (85%) of 2-carbomethoxymethylpiperazin-3-one, M.P. 95-96° C., which was recrystallized from acetone and ether mixtures. The hydrochloride of this product melts at 212-213° C. and crystallized from methanol-ether mixtures.

Example IV

Following a similar procedure the same product was obtained equally well using methyl fumarate and ethylenediamine.

Example V

Addition of 8 g. of ethylenediamine to a solution of 20 g. (0.1 M) of n-propyl fumarate in 100 cc. of ether gave an oily precipitate at once. After 3 hours at room-temperature, 12 g. (60%) of 2-carbopropoxymethylpiperazin-3-one was obtained as white crystals melting at 85-86° C. after recrystallization from ethyl-acetate-hexane.

Example VI

A solution of 23 g. of n-butyl maleate and 8 g. of ethylenediamine in 100 cc. of ether was left several hours at room-temperature. The solid 2-carbobutoxymethylpiperazin-3-one was collected and was recrystallized from an ethyl-acetate-hexane mixture. The yield was 14 g. (67%) melting at 92-94° C. This substance formed a hydrochloride melting at 173-174° C.

Example VII

A mixture of 15 g. (0.1 M) of methyl fumarate and 10 g. (0.11 M) of N,N'-dimethylethylenediamine was heated for 5-6 hours in a metal bath at 110-170° C. under a reflux condenser provided with a Dean-Stark trap. In this way 4.5 cc. of methanol was collected in the trap. The product, 1,4-dimethyl-2-carbomethoxymethyl-piperazin-3-one was distilled in vacuo, and 16 g. (80%) was collected boiling at 182-184° C. at 20 mm. The product forms a hydrochloride melting at 165-166° C. and a methiodide which melts at 222-223° C.

Example VIII

A mixture of 14.4 g. (0.1 M) of methyl maleate and 15 g. (0.1 M) of N,N'-di-n-propylethylenediamine was heated for 24 hours at 100° C. The 1,4-di-n-propyl-2-carbomethoxymethylpiperazin-3-one was distilled in vacuo and boiled at 187-189° C. at 10 mm. The yield was 25 g. The hydrochloride melted at 130-132° C. and the methiodide at 162-164° C.

Example IX

A mixture of 14.4 g. (0.1 M) of methyl fumarate and 18 g. (0.1 M) of N,N'-di-n-butylethylenediamine was heated for 1¼ hours in a metal bath at 170-220° C. under reflux. Methanol evolved was collected in a Dean-Stark trap. Table I below shows results of time and temperature of reaction and methanol collected.

| Table I | Time, p.m. | bath T.; °C. | Vol. MeOH |
|---|---|---|---|
| The product 1,4-di-n-butyl-2-carbomethoxymethyl-piperazin-3-one, was distilled and 20 g. (70-75%) was collected boiling at 203-204° C. at 11 mm. | 2:35 | 143 | 0. |
| | 2:40 | 160 | 0. |
| | 2:40 | 168 | (boiling starts.) |
| | 2:40 | 188 | (rapid boil, 1 cc.) |
| | 2:45 | 220 | 3 cc. |
| | 2:45 | 215 | 3.2 cc. |
| | 2:50 | 205 | 3.5 cc. |
| | 2:55 | 197 | 3.5 cc. |
| | 3:15 | 192 | 3.6 cc. |
| | 3:25 | 190 | 3.8 cc. |
| | 3:45 | 190 | 4.0 cc. |
| | 3:50 | 190 | 4.0 cc. |
| | | Stop heating | |

Example X

A mixture of 9 g. (0.05 M) of ethyl fumarate and 14 g. (0.06 M) of N,N'-dibenzylethylenediamine was heated for 24 hours at 100° C. The 1,4-dibenzyl-2-carboethoxymethylpiperazin-3-one was isolated at the hydrochloride, which crystallized from methanol-ether. The yield was 18 g. (90%) M.P. 147-148° C.

Example XI

A solution of 19 g. (0.1 M) of methyl-β-benzoylacrylate in 300 cc. of ether was treated with 7 g. (0.11 M) of ethylenediamine. The reaction mixture became turbid at once and white crystals started to appear in a few minutes. After several hours the 2-phenacylpiperazin-3-one was collected and was recrystallized from an acetone-ether mixture. The yield amounted to 11 g. (50%) melting at 99-100° C. The hydrochloride of this base melted at 221-222° C.

Example XII

A solution of 7.5 g. (0.04 M) of the product of Example I plus 10 g. (5.5 cc.) of ethyliodide in 25 cc. of ethanol was refluxed for 20 hours. On cooling 10 g. of yellow crystals formed and melted at 217-218° C. after recrystallization from methanol. This product is 1-ethyl-2-carboethoxymethylpiperazin-3-one hydroiodide.

Example XIII

In similar fashion the product of Example I when refluxed with excess n-propyliodide in ethanol or acetonitrile gave 1-n-propyl-2-carboethoxymethylpiperazin-3-one hydroiodide melting at 178–180° C.

Example XIV

Refluxing a solution of the product of Example I with ethylchloroacetate in ethanol gave 1,2-dicarboethoxymethylpiperazin-3-one hydrochloride melting at 169–170° C.

Example XV

Alkylation of the product of Example I with p-nitrobenzyl chloride was accomplished by refluxing the reactants in ethanol, acetone or acetonitrile. The 1-(4'-nitrobenzyl)-2-carboethoxymethylpiperazin-3-one was isolated as its hydrochloride salt, which crystallized from ethanol and melts at 201–202° C.

Example XVI

Refluxing of the product of Example I with excess methyliodide in ethanol for 10 hours gave 1-methyl-2-carboethoxymethylpiperazin-3-one hydroiodide melting at about 125° C.

Example XVII

A mixture of 9.3 g. (0.05 M) of the product of Example I, 40 cc. of acetonitrile and 12 cc. of n-butyliodide was refluxed for 12 hours. The product, 1-n-butyl-2-carboethoxymethylpiperazin-3-one hydroiodide, was recrystallized from acetone-ether mixtures and melted at about 95° C.

Example XVIII

A mixture of the product of Example I and benzhydryl chloride was refluxed for several hours in acetone solution and gave 1-benzhydryl-2-carboethoxymethylpiperazin-3-one hydrochloride melting at 139–140° C. after recrystallization from ethanol.

The compounds of the invention may be prepared in the form of bases, acid addition and quaternary salts which are regarded as equivalent in the accompanying claims.

What I claim is:

1. A compound having the formula:

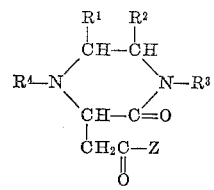

wherein $R^1$ and $R^2$ are radicals selected from the class of the lower alkyl groups and hydrogen, $R^3$ and $R^4$ are radicals selected from the class consisting of the lower alkyl groups, the (aryl) lower alkyl radicals and hydrogen and Z is a lower alkoxy radical.

2. A process of preparing a compound having the formula:

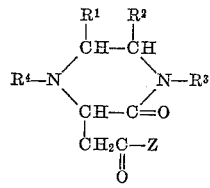

wherein $R^1$ and $R^2$ are radicals selected from the class of the lower alkyl groups and hydrogen, $R^3$ and $R^4$ are radicals selected from the class consisting of the lower alkyl groups, the (aryl) lower alkyl radicals and hydrogen and Z is a lower alkoxy radical, which consists of reacting a diamine of the formula

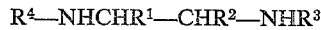

with an ester of the structure

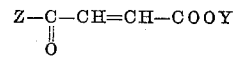

wherein $R^1$, $R^2$, $R^3$, $R^4$ and Z are defined as above and Y is a lower alkyl radical, at a temperature not exceeding 200° C.

3. 2-carbalkoxymethylpiperazin-3-one.
4. 2-carbethoxymethylpiperazin-3-one.
5. 2-carbomethoxymethylpiperazin-3-one.
6. 1,4-dimethyl-2-carbethoxymethylpiperazin-3-one.
7. 1,4-dibenzyl-2-carbethoxymethylpiperazin-3-one.

References Cited in the file of this patent

UNITED STATES PATENTS 2,650,223   Zaugg et al. _____ Aug. 25, 1953